US012233294B2

(12) United States Patent
Patton

(10) Patent No.: US 12,233,294 B2
(45) Date of Patent: Feb. 25, 2025

(54) HARNESS ADJUSTMENT DEVICE

(71) Applicant: WERNER CO., Greenville, PA (US)

(72) Inventor: Justin Patton, Franklin, PA (US)

(73) Assignee: WERNER CO., Itasca, IL (US)

(*) Notice: Subject to any disclaimer, the term of this patent is extended or adjusted under 35 U.S.C. 154(b) by 732 days.

(21) Appl. No.: 17/032,312

(22) Filed: Sep. 25, 2020

(65) Prior Publication Data

US 2022/0096881 A1 Mar. 31, 2022

(51) Int. Cl.
*A62B 35/00* (2006.01)
*B65H 75/44* (2006.01)

(52) U.S. Cl.
CPC ...... *A62B 35/0025* (2013.01); *A62B 35/0018* (2013.01); *A62B 35/0031* (2013.01); *B65H 75/4431* (2013.01)

(58) Field of Classification Search
CPC ............ A62B 35/0025; B65H 75/4431; Y10T 24/2175; B60P 7/0846; F16G 11/12; A44B 99/00; A44B 11/125
See application file for complete search history.

(56) References Cited

U.S. PATENT DOCUMENTS 807,965 A * 12/1905 Rice ................... B65H 75/4431 242/385.4
4,823,443 A * 4/1989 Waters ................... B61D 45/00 24/68 CD
5,156,506 A * 10/1992 Bailey .................. B61D 45/003 410/100
5,897,039 A * 4/1999 Swenke ............. B65H 75/4431 150/108
6,135,685 A 10/2000 Anthony et al.
6,230,370 B1 * 5/2001 Nelsen ................. A44B 11/125 24/68 CD
6,241,174 B1 * 6/2001 Nelsen ................. B65H 54/585 242/388.3

(Continued)

FOREIGN PATENT DOCUMENTS

CN 103948217 A 7/2014

OTHER PUBLICATIONS

Taiwan Intellectual Property Office "Office Action and Search Report" from corresponding Taiwan Patent Application Serial No. 202216003, dated Jan. 13, 2025. Search Report English translation also attached.

*Primary Examiner* — Jessica L Laux
*Assistant Examiner* — Kathleen M. McFarland
(74) *Attorney, Agent, or Firm* — Eckert Seamans Cherin & Mellott, LLC

(57) ABSTRACT

A harness adjustment device for adjusting a length of webbing includes a toothed rotational member including a spool structured to receive the webbing and an end portion including teeth disposed at an end of the spool, the toothed rotational member being structured to rotate to draw in or let out the webbing, and an engagement mechanism having an engagement portion. The engagement portion is structured to move between a first position in which the engagement portion abuts against the toothed rotational member between at least two of the teeth and prevents rotation of the toothed rotational member, and a second position in which the engagement portion is separated from the toothed rotational member and allows rotation of the toothed rotational member.

19 Claims, 12 Drawing Sheets

(56) References Cited

U.S. PATENT DOCUMENTS 6,273,353 B1 * 8/2001 Berger ............... A44B 11/2557 24/68 CD
6,279,847 B1 * 8/2001 Berger .................. B60R 22/347 24/68 CD
6,322,279 B1 * 11/2001 Yamamoto .............. B60R 9/045 403/93
6,641,116 B1 * 11/2003 Huang .................... B60P 7/083 254/218
6,665,910 B2 * 12/2003 Huang .................... B60P 7/083 24/68 CD
7,069,623 B2 * 7/2006 Lu ........................... B60P 7/083 24/69 ST
7,334,301 B2 * 2/2008 Huang .................. B60P 7/0823 24/170
7,350,767 B2 * 4/2008 Huang .................... B60P 7/083 254/218
7,398,979 B2 * 7/2008 Yu Chen ............ B65H 75/4431 280/47.24
7,472,890 B2 * 1/2009 Huang .................... B65B 13/18 24/69 ST
7,600,660 B2 * 10/2009 Kasper .................... A45F 3/047 2/338
7,712,192 B2 * 5/2010 Lin .................... A61B 17/1322 24/70 ST
8,967,332 B2 * 3/2015 Wolner .............. A62B 35/0031 254/222
9,067,088 B2 * 6/2015 Vieux ................ A62B 35/0031
9,681,705 B2 * 6/2017 Trudel ..................... A43C 7/00
9,862,300 B1 * 1/2018 Anderson ............. B60P 7/0846
9,902,590 B2 * 2/2018 Dufek .................. B65H 75/446
9,937,367 B1 * 4/2018 Huang ............... A62B 35/0025
9,993,048 B2 * 6/2018 Casebolt ............ A62B 35/0025
10,232,199 B2 * 3/2019 Perner ................ A62B 35/0031
10,233,052 B2 * 3/2019 Joyner ................... A45C 11/00
10,264,852 B2 * 4/2019 Kim ..................... A43C 11/165
10,327,942 B2 * 6/2019 Nolt ...................... A61F 5/0102
10,399,814 B2 * 9/2019 Shavell .............. B65H 75/4431
10,442,657 B1 * 10/2019 Hinnant ............. A62B 35/0093
10,556,773 B2 * 2/2020 Tang ...................... B65H 75/48
10,633,218 B2 * 4/2020 Wang ................... A43C 11/165
10,718,406 B2 * 7/2020 Farrell ............... A62B 35/0025
10,935,104 B2 * 3/2021 D'Antonio .............. F16G 11/12
2003/0177581 A1 * 9/2003 Huang .................... B25B 25/00 5/625
2005/0029381 A1 * 2/2005 Lamonica ............... B63B 34/67 242/385.4
2005/0247813 A1 * 11/2005 Kovacevich ............. A42B 3/14 242/395
2005/0279797 A1 * 12/2005 Martin ..................... B63H 8/56 114/39.18
2006/0042052 A1 * 3/2006 Lu ........................... B60P 7/083 24/68 CD
2006/0131457 A1 * 6/2006 Nohren ................. B60R 22/415 242/384.7
2008/0010791 A1 * 1/2008 Huang .................. B60P 7/0823 24/68 CD
2008/0128541 A1 * 6/2008 Huang ............... B65H 75/4442 242/389
2010/0242232 A1 * 9/2010 Wolner .............. A62B 35/0031 24/166
2010/0242233 A1 * 9/2010 Wolner .............. A62B 35/0031 24/197
2011/0167543 A1 * 7/2011 Kovacevich ............ F16G 11/12 2/417
2011/0168487 A1 * 7/2011 Steck ................. A62B 35/0031 24/115 R
2011/0302688 A1 * 12/2011 Vieux ................ A62B 35/0031 24/182
2013/0276718 A1 * 10/2013 Valadez ............... A01K 27/004 119/796
2015/0076272 A1 * 3/2015 Trudel ................. A43C 11/165 242/381.4
2016/0198801 A1 * 7/2016 Kim ..................... A43C 11/165 24/68 C
2016/0360838 A1 * 12/2016 Casebolt .............. A44B 11/065
2016/0361577 A1 * 12/2016 Perner ................ A62B 35/0037
2017/0013343 A1 * 1/2017 Tomlinson ........... B65H 75/406
2017/0128755 A1 * 5/2017 Denike .................... A62B 9/04
2017/0158457 A1 * 6/2017 Shavell ................ B65H 75/446
2017/0231799 A1 * 8/2017 Nolt .................... A61F 5/05808 602/16
2017/0326389 A1 * 11/2017 Vergara .............. A62B 35/0006
2017/0369274 A1 * 12/2017 Joyner ............... B65H 75/4439
2019/0154116 A1 * 5/2019 Farrell .................... F16G 11/12
2019/0174869 A1 * 6/2019 Wang ..................... B65H 75/26
2019/0209877 A1 * 7/2019 Farrell .................. F16D 63/008
2019/0308041 A1 * 10/2019 Harding ................. A62B 35/04
2019/0337755 A1 * 11/2019 Tang ........................ F16D 41/12
2019/0389687 A1 * 12/2019 Bessac ............... B65H 75/4431
2020/0047006 A1 * 2/2020 Blackford ................. F03G 5/04
2020/0087104 A1 * 3/2020 Wang ................. B65H 75/4415
2020/0107615 A1 * 4/2020 Auston .............. A62B 35/0037
2020/0108283 A1 * 4/2020 Auston .............. A62B 35/0025
2020/0284319 A1 * 9/2020 D'Antonio .............. F16G 11/12
2022/0234862 A1 * 7/2022 Hurley ....................... A61F 5/32
2022/0304425 A1 * 9/2022 Hurley ................. B65H 75/406

* cited by examiner

HARNESS ADJUSTMENT DEVICE

BACKGROUND

Field

The disclosed concept relates generally to fall protection devices, and in particular, to devices for adjusting a harness in a fall protection system.

Background Information

In fall protection systems, a worker typically wears a safety harness. Straps of the safety harness are comprised of webbing. The harness should fit a user properly. For example, the harness should not be too loose, as that could present of risk of the harness coming off of the user. The harness should also not be too tight as that could be uncomfortable for the user or could create issues such as cutting off circulation or bruising the user.

A harness could be custom made to fit a particular user, but that would not be practical or cost efficient. As such, many harnesses provide for manual adjustment of the lengths of various straps. However, conventional adjustment devices can be difficult to work with and it can be difficult to get a proper fit. This consumes the time and effort of the user and often does not result in an ideal fit. There remains room for improvement in devices for adjusting the fit of a harness.

SUMMARY

These needs and others are met by embodiments of the disclosed concept in which a harness adjustment device provides for adjustment of a length of webbing of a harness.

In accordance with one aspect of the disclosed concept, a harness adjustment device for adjusting a length of webbing comprises: a toothed rotational member including a spool structured to receive the webbing and an end portion including teeth disposed at an end of the spool, the toothed rotational member being structured to rotate to draw in or let out the webbing; and an engagement mechanism having an engagement portion, wherein the engagement portion is structured to move between a first position in which the engagement portion abuts against the toothed rotational member between at least two of the teeth and prevents rotation of the toothed rotational member, and a second position in which the engagement portion is separated from the toothed rotational member and allows rotation of the toothed rotational member.

In accordance with another aspect of the disclosed concept, a safety harness for use in a fall protection system comprises: a strap composed of webbing; a harness adjustment device coupled to the webbing and structured to adjust a length of the webbing, the harness adjustment device comprising: a toothed rotational member including a spool structured to receive the webbing and an end portion including teeth disposed at an end of the spool, the toothed rotational member being structured to rotate to draw in or let out the webbing; an engagement mechanism having an engagement portion, wherein the engagement portion is structured to move between a first position in which the engagement portion abuts against the toothed rotational member between at least two of the teeth and prevents rotation of the toothed rotational member, and a second position in which the engagement portion is separated from the toothed rotational member and allows rotation of the toothed rotational member.

In accordance with another aspect of the disclosed concept, a harness adjustment device for adjusting a length of webbing comprises: a lockable spool structured to draw in or let out the webbing, the lockable spool being prevented from drawing in or letting out the webbing when locked and being allowed to draw in or let out the webbing when unlocked; a biasing member structured to bias the lockable spool to draw in the webbing; and an engagement mechanism structured to selectively lock and unlock the lockable spool, wherein the engagement mechanism is structured to require two actions to unlock the lockable spool.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
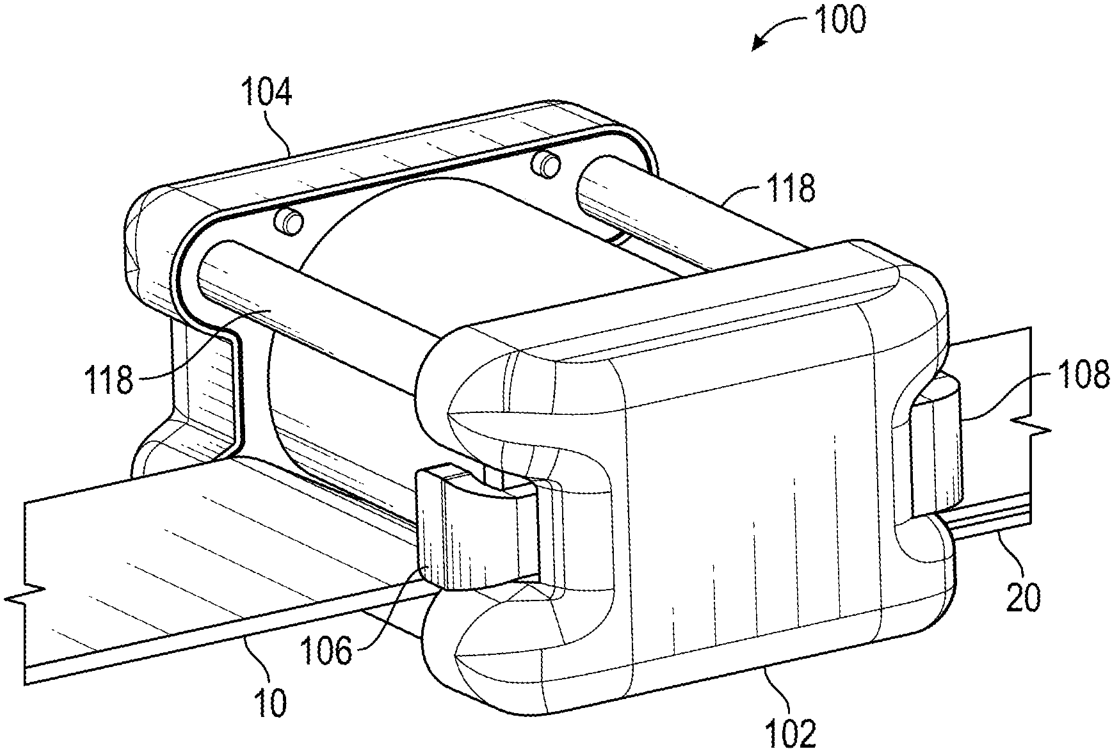
FIG. 1 is a view of a harness adjustment device in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

Figure 2:
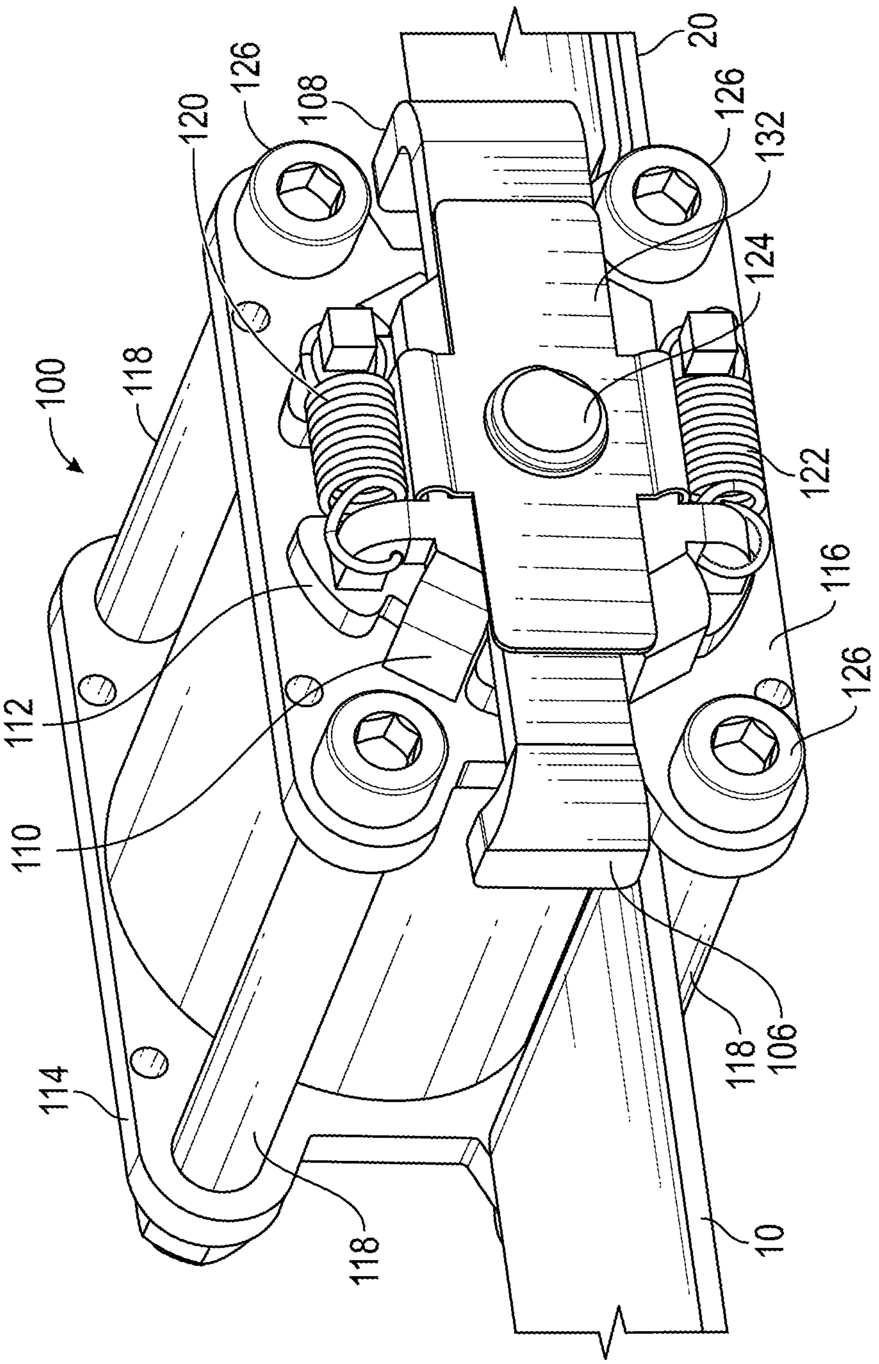
FIG. 2 is a view of the harness adjustment device of FIG. 1 with end covers removed in accordance with an example embodiment of the disclosed concept.
Figure 3:
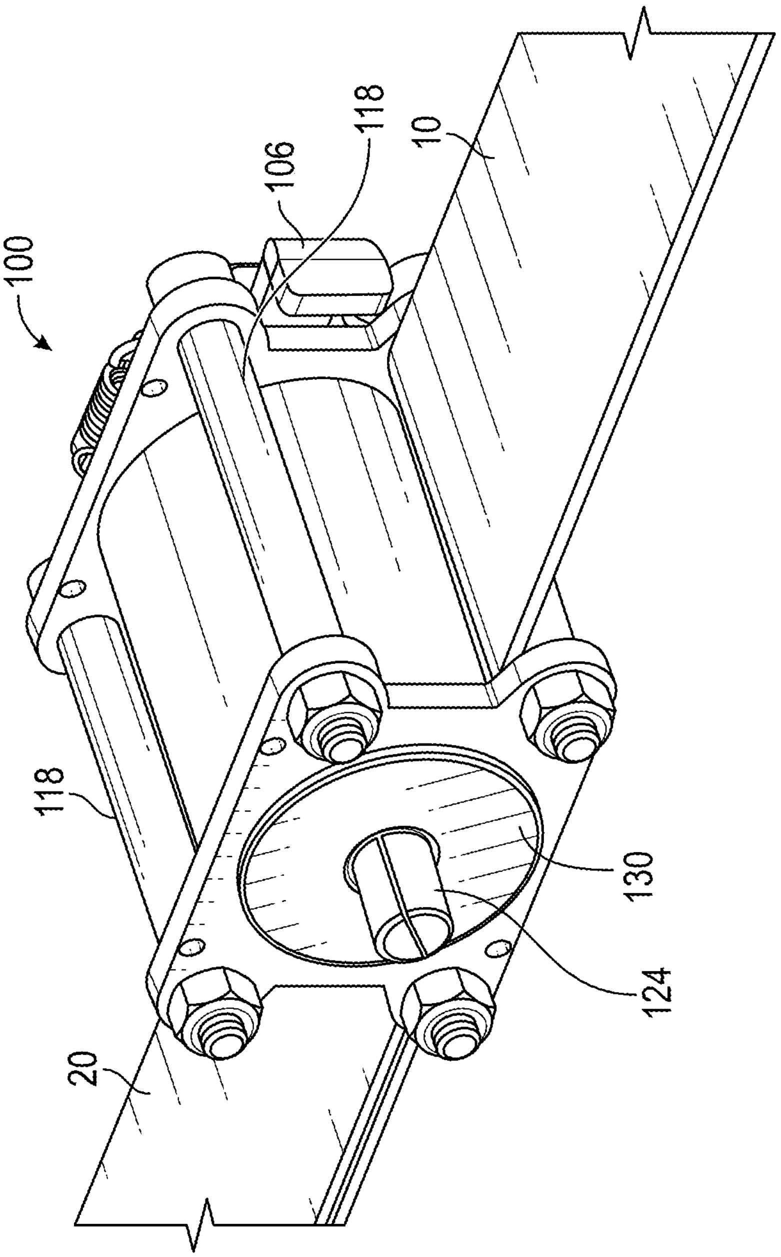
FIG. 3 is another view of the harness adjustment device of FIG. 1 with end covers removed in accordance with an example embodiment of the disclosed concept.
Figure 4:
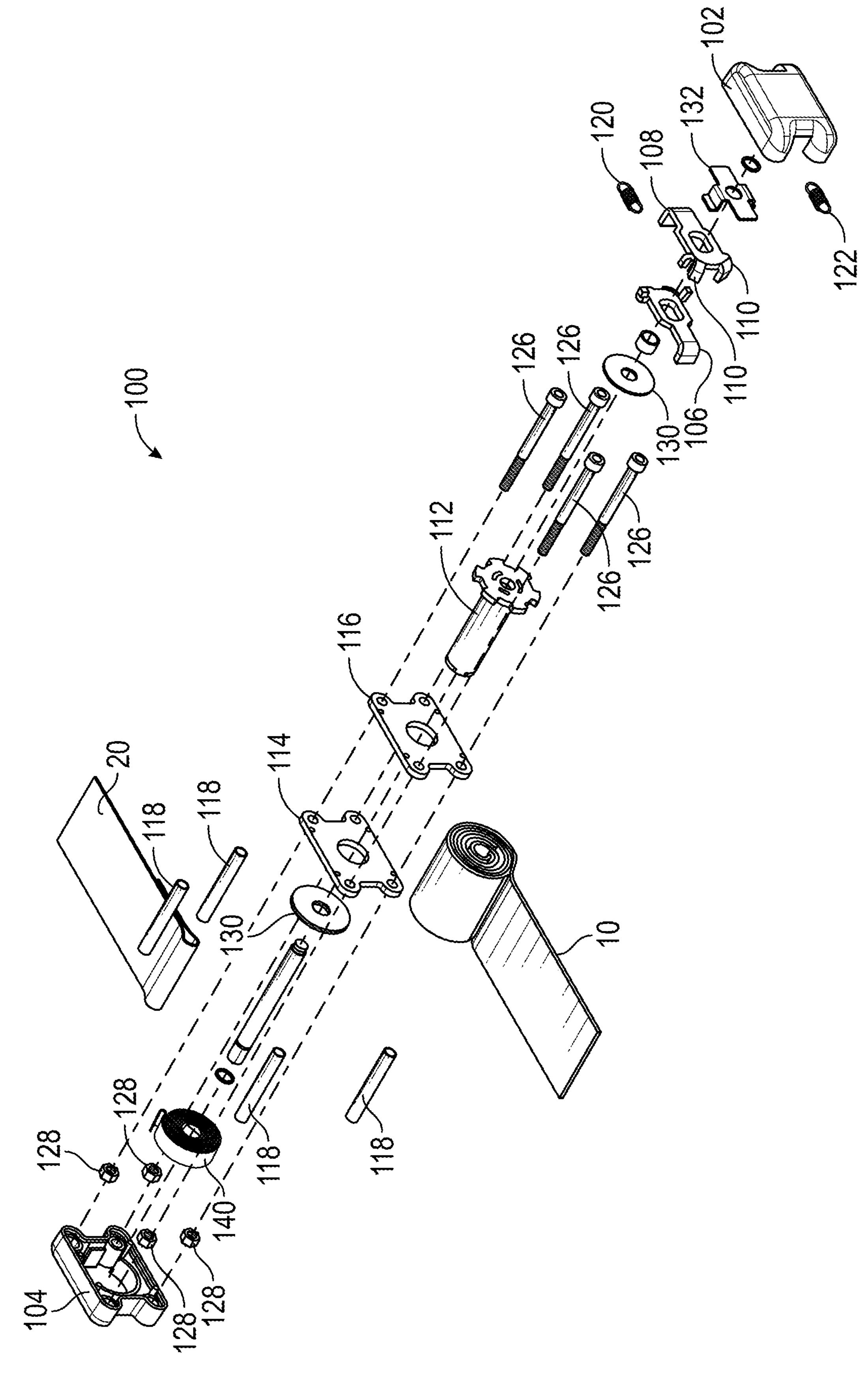
FIG. 4 is an exploded assembly view of the harness adjustment device of FIG. 1 in accordance with an example embodiment of the disclosed concept.
Figure 5:
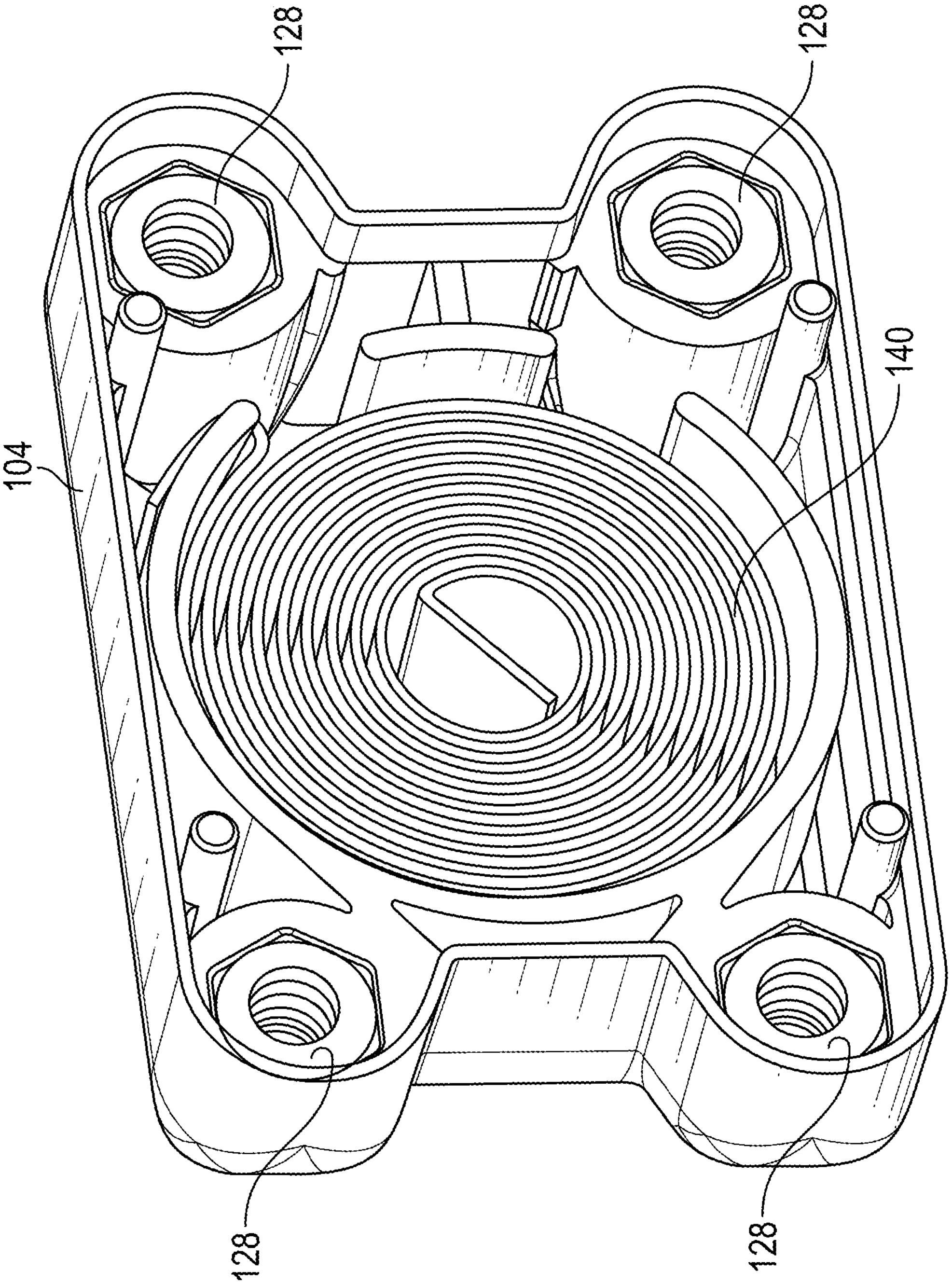
FIG. 5 is a view of a portion of a cover and a torsion spring included in the harness adjustment device of FIG. 1 in accordance with an example embodiment of the disclosed concept.

FIG. 1 is a view of a harness adjustment device 100 in accordance with an example embodiment of the disclosed concept. FIG. 2 is a view of the harness adjustment device 100 of FIG. 1 with end covers 102,104. FIG. 3 is another view of the harness adjustment device 100 of FIG. 1 with end covers 102,104 removed. FIG. 4 is an exploded assembly view of the harness adjustment device 100 of FIG. 1. FIG. 5 is a view of a portion of a cover 104 and a torsion spring 140 included in the harness adjustment device of FIG. 1 in accordance with an example embodiment of the disclosed concept The harness adjustment device 100 is coupled to webbing 10,20, such as webbing used in a safety harness 1000 (shown in FIGS. 15 and 16). The harness adjustment device 100 is operable to draw in or let out the webbing 10 on one side. The webbing 20 on the other side of the harness adjustment device 100 is fixedly connected to the harness adjustment device 100. The harness adjustment device 100 is operable to be selectively changed from a locked orientation, in which the webbing 10 is unable to be drawn in or let out, to an unlocked orientation, in which the webbing 10 is able to be drawn in or let out. By drawing in or letting out the webbing 10 from the harness adjustment device 100, when unlocked, the length of a strap of the safety harness 1000 are able to be adjusted. When the desired length is achieved, the harness adjustment device 100 is then locked, thus fixing the length of the strap of the safety harness 1000. In some example embodiments, the harness adjustment device 100 defaults to the locked orientation and is temporarily changed to the unlocked orientation by interacting with the harness adjustment device 100. Additionally, in some example embodiments, the harness adjustment device 100 is biased to draw in the webbing 10 when in the unlocked orientation such that letting out the webbing 10 requires the webbing 10 to be pulled away from the harness adjustment device 100. In this manner, when the harness adjustment device 100 is unlocked, the webbing 10 is drawn in to create a snug fit of the strap of the safety harness 1000. Then the harness adjustment device 100 defaults to the locked orientation fixing the length of the strap. An example embodiment of the harness adjustment device 100 will be described in more detail herein.

The harness adjustment device 100 includes a first engagement mechanism 106 and a second engagement mechanism 108. The harness adjustment device 100 further includes a toothed rotational member 112 that includes a spool structured to receive the webbing 10 and an end portion including teeth. The webbing 10 is wrapped around the toothed rotational member 112 such that rotating the toothed rotational member 112 causes the webbing 10 to be drawn in or let out. The toothed rotational member 112 includes teeth on its end portion and the second engagement mechanism 108 includes engagement portions 110 that are structured to fit between the teeth of the toothed rotational member 112. The second engagement mechanism 108 is structured to move laterally between a first position in which the engagement portions 110 fit between the teeth of the toothed rotational member 112 and a second position in which the engagement portions 110 are separated from the toothed rotational member 112. In the first position, the engagement portions 110 abut against the teeth of the toothed rotational member 112 and prevent it from rotating. The first positon corresponds to the locked orientation of the harness adjustment device 100, as the webbing 10 cannot be drawn in or let out. In the second position, the engagement portions 110 are separated from the toothed rotational member 112, thus allowing the toothed rotational member 112 to rotate. The second position corresponds to the unlocked orientation of the harness adjustment device 100, as the toothed rotational member 112 is able to rotated and the webbing 10 is able to be drawn in or let out.

The second engagement mechanism 108 is biased to the first position by first and second biasing members 120,122 (e.g., without limitation, springs). The first and second biasing members 120,122 are each attached at one end to the first engagement mechanism 106 and at the other end to the second engagement mechanism 108, and bias the first and second engagement mechanisms 106,108 in a first direction in which the engagement portions 110 are moved toward the toothed rotational member 112. Pressing ends of the first and second engagement mechanisms 106,108 in a second direction, opposite of the first direction, causes the engagement portions 110 to move away from the toothed rotational member 112. Thus, as user can press on ends of the first and second engagement mechanisms 106,108 to unlock the harness adjustment device 100. When the ends are released, the first and second biasing members 120,122 pull the engagement portions 110 back against the toothed rotational member 112, thus defaulting the harness adjustment device 100 back to a locked orientation.

The first engagement mechanism 106 includes a planar body portion and an end portion. The end portion extends in a direction perpendicular to the planar body portion. The first engagement mechanism 106 also includes an opening in the planar body portion through which an axle 124 is passed. The first engagement mechanism 106 may also include attachment points, such as posts, to which the first and second biasing members 120,122 may be attached.

The second engagement mechanism 108 also includes a planar body portion and an end portion. The end portion extends in a direction perpendicular to the planar body portion. The end portions of the first and second engagement mechanisms 106,108 may be simultaneously pressed toward each other to move the second engagement mechanism 108 from the first position to the second position. The planar body portions of the first and second engagement mechanisms 106,108 are disposed in planes parallel to the plane of the end portion of the toothed rotational member 112. The engagement portions 110 of the second engagement mechanism 108 may be one or more prongs that extend in a direction perpendicular to the planar body member of the second engagement mechanism 108. When the second engagement member 108 is in the first position, the one or more prongs extend between teeth of the toothed rotational member 112. The planar body member of the second engagement mechanism 108 may also include an opening through which the axle 124 is passed. The second engagement mechanism 108 may also include attachment points, such as prongs, to which the first and second biasing members 120,122 may be attached.

The axle 124 extends through the toothed rotational member 112 and the first and second engagement mechanisms 106,108. A torsional spring 140 may be coupled to the axle 124 to cause the axle 124 to bias the toothed rotational member 112 in a direction that draws in the webbing 10. In this manner, when the harness adjustment device 100 is unlocked and tension is not applied to the webbing 10, the webbing 10 will automatically be drawn in. Automatically drawing in the webbing 10 when the toothed rotational member 112 is unlocked allows the webbing 10 to be drawn in to a snug fit. Additionally, a user can one-handedly unlock the toothed rotational member 112 to have the webbing 10 drawn in and does not need a second hand to manually draw in the webbing 10.

In example embodiments, the harness adjustment mechanism 100 includes various additional components. The harness adjustment device 100 may include first and second frame portions 114,116. The first and second frame portions 114,116 may be substantially planar members. The first and second framer portions 114,116 may be separated by spacers 118 that extend between them. At least one of the spacers 118 may be utilized as an attachment point for the webbing 20. Nuts 128 and bolts 126 may be used to attach the first and second frame portions 114,116 to each other. For example, the bolts 126 may extend through the spacers 118. It will be appreciated through that other types of fasteners may be employed without departing from the scope of the disclosed concept. The spool of the toothed rotational member 112 may extend between the first and second frame portions 114,116. The toothed rotational member 112 may extend through the first and second frame portions 114,116 such that the end portion of the toothed rotational member including the teeth is disposed outside the area between the first and second frame portions 114,116. The first and second engagement mechanisms 106,108 may also be disposed outside the area between the first and second frame portions 106,108. Additional components, such as washers 130 and an end member 132 may be employed in the harness adjustment device 100.

The end member 132 may serve as a retainer plate that allows a retaining ring to hold the first and second engagement mechanisms 106,108 flat against the end portion of the toothed rotational member 112. If the first and second engagement mechanisms 106,108 were to change orientation away from flat against the end portion of the toothed rotational member 112, there is a possibility that the engagement portions 110 would not properly engage between teeth of the tooted rotational member 112 to lock it. The end member 132 may also include folded tabs on its upper and lower portions. The folded tabs may extend along upper and lower edges, respectively, of the first and second engagement mechanisms 106,108, which additionally ensures linear motion of the first and second engagement mechanisms 106,108. The folded tabs may additionally extend between the first and second biasing members 120,122 and the end portion of the toothed rotational member 112, which prevents undesired interaction between the first and second biasing members 120,122 and the toothed rotational member 112. The folded tabs may additionally interlock with the second end cover 102, which secures the end member 132 in place and ensures that it retains its position so as to guide the first and second engagement mechanisms 102,104 in their linear movements.

The harness adjustment device 100 may also include first and second end covers 102,104. The first and second end covers 102,104, may couple to the first and second frame portions 114,116, respectively. The first end cover 102 may cover one end of the axle 124. The second end cover 104 may cover the end portion of the toothed rotational member 112 as well and portions of the first and second engagement mechanisms 106,108. The second end cover 104 may have opening that allow end portions of the first and second engagement mechanisms 106,108 to pass through such that they can be interacted with by a user.

While a particular arrangement of a harness adjustment device 100 is shown in FIGS. 1-5, it will be appreciated that adjustments and modification, including the addition, removal, modification, rearrangement, etc. of components may be employed without departing from the scope of the disclosed concept. While the harness adjustment device 100 has been described in the context of adjusting the length of webbing in a safety harness, it will be appreciated that the disclosed concept may be employed in other applications, such as any application where adjustment of a length of webbing is desired, without departing from the scope of the disclosed concept. Some additional example embodiments will be described hereinafter.

Figure 6:
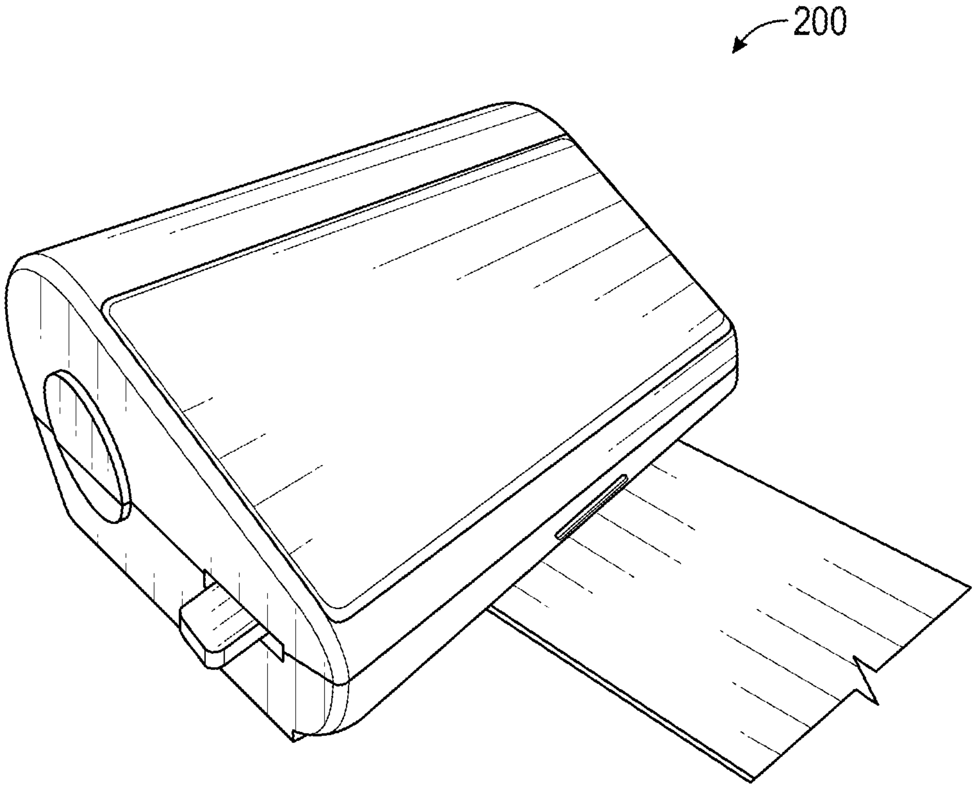
FIG. 6 is a view of a harness adjustment device in accordance with another example embodiment of the disclosed concept.
Figure 7:
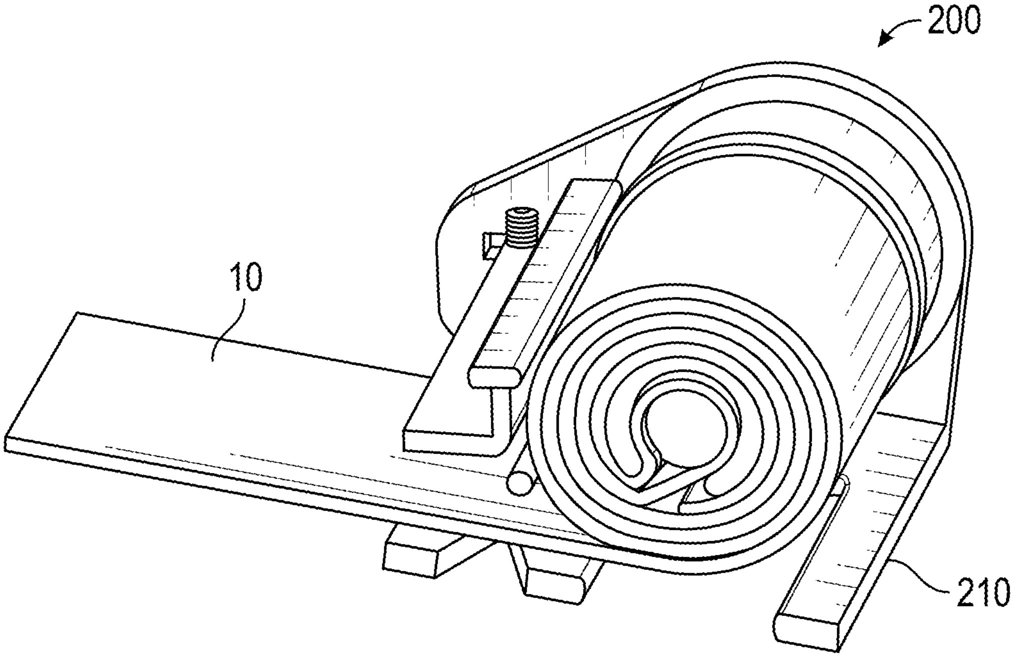
FIG. 7 is a cross-sectional view of the harness adjustment device of FIG. 6 with the cover removed in accordance with an example embodiment of the disclosed concept.
Figure 8:
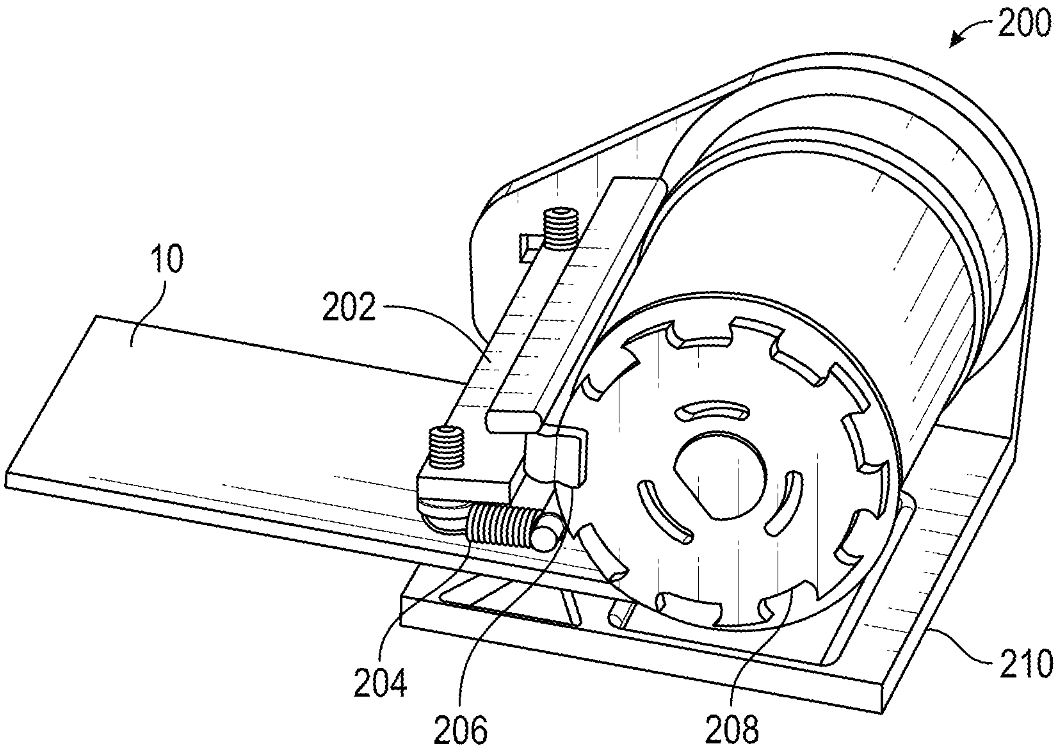
FIG. 8 is another cross section view of the harness adjustment device of FIG. 6 with the cover removed in accordance with an example embodiment of the disclosed concept.
Figure 9:
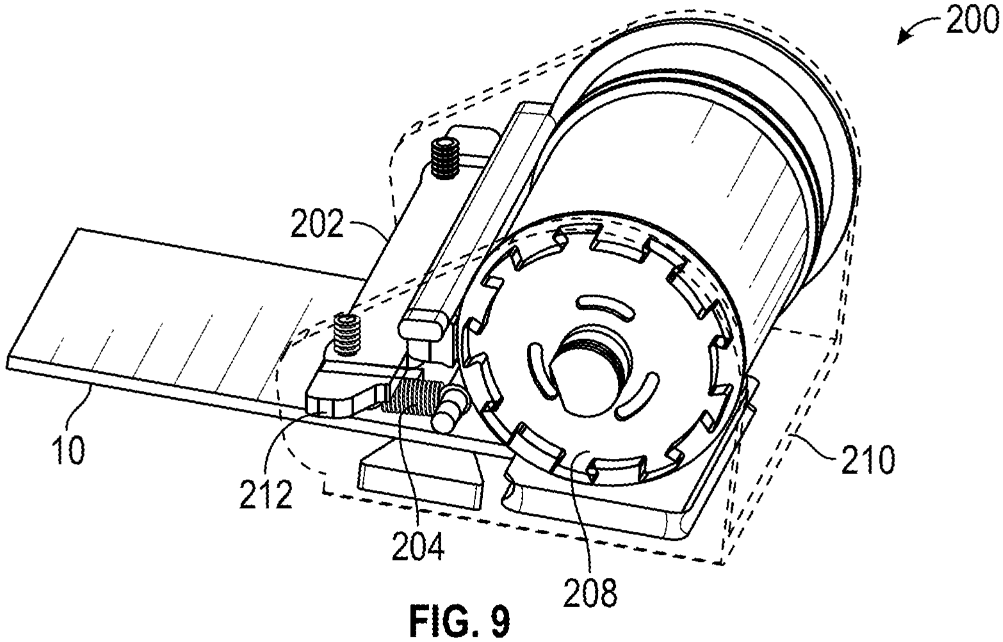
FIG. 9 is a view of the harness adjustment device of FIG. 6 with the cover removed in accordance with an example embodiment of the disclosed concept.
Figure 10:
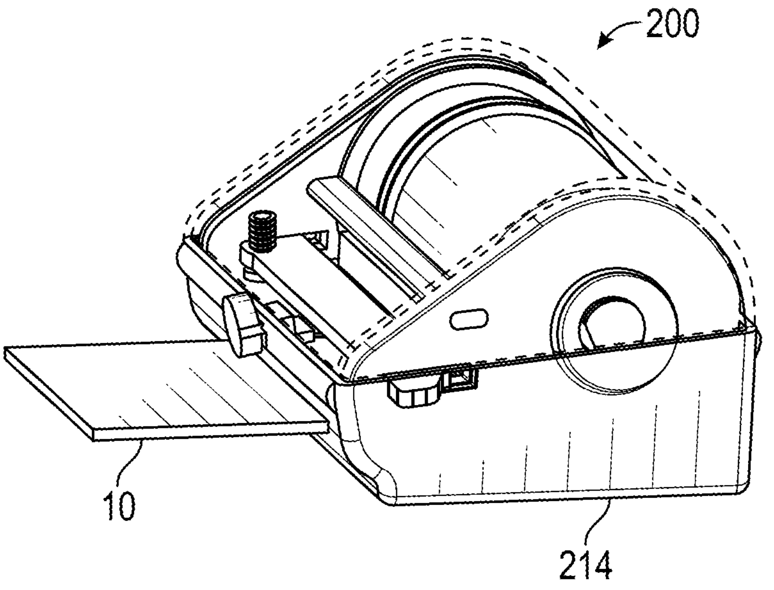
FIG. 10 is a view of the harness adjustment device of FIG. 6 with the cover partially removed in accordance with an example embodiment of the disclosed concept.

FIG. 6 is a view of a harness adjustment device 200 in accordance with another example embodiment of the disclosed concept. FIG. 7-9 are various cross-sectional view of the harness adjustment device 200 of FIG. 6 with the cover removed and FIG. 10 is a view of the harness adjustment device 200 of FIG. 6 with the cover partially removed in accordance with an example embodiment of the disclosed concept.

The harness adjustment device 200 operated similar to the harness adjustment device 100 in that the harness adjustment device 200 has a locked orientation in which webbing 10 is prevented from being drawn in or let out and an unlocked position in which the webbing 10 can be drawn in or let out. The harness adjustment device 200 includes a toothed rotational member 208 and an engagement mechanism 202. The engagement mechanism 202 includes a planar portion and at least one engagement portion 206. The engagement mechanism 202 is moveable between a first position in which the engagement portion 206 abuts against the toothed rotational member 208 between teeth of the toothed rotational member 208, thus preventing its rotation, and a second position in which the engagement portion 206 is separated from the toothed rotational member 208, thus allowing its rotation. The engagement portion 208 may include one or more prongs that extend from the planar body of the engagement mechanism 202 in a direction toward the toothed rotational member 208. The prongs may be shaped such that they fit between teeth of the toothed rotational member 208.

The engagement mechanism 202 may also include one or more end portions 212. The one or more end portions 212 may extend through and to the outside of a cover 214 of the harness adjustment device 200 such that a user can interact with the end portions 214. The end portions 214 may be interacted with to move the engagement mechanism 202 from the first position to the second position.

The harness adjustment device 200 may include one or more biasing members 204 that are coupled to the engagement mechanism 202 and are structured to bias the engagement mechanism 202 to the first position in which the engagement portion 204 abut against the toothed rotational member 208 between its teeth. The toothed rotational member 208 may be released and allowed to rotate by pressing the end portions 212 to move the engagement mechanism from the first position to the second position.

The toothed rotational member 208 includes a spool which receives the webbing 10. Rotation of the tooted rotational mechanism 208 draws in or lets outs the webbing 10. A torsional spring may be employed to bias the toothed rotational mechanism 208 to draw in the webbing 10. The end portion of the toothed rotational member 208 is a disc shape including a number of teeth, and, as described above the engagement portion 204 may abut between the teeth to prevent rotational of the toothed rotational member 208.

The harness adjustment device 200 may also include a frame 210 and a cover 214. The frame 210 is structured to support the engagement mechanism 202 and the toothed rotational member 208. The cover 214 may be a two part cover that is joined together to cover the toothed rotational member 208 and a portion of the engagement mechanism 202. The cover 214 may include one or more openings that allow end portions 212 of the engagement mechanism to pass through it. The cover 214 may also include an opening that allows the webbing 10 to enter it and reach the toothed rotational member 208.

While another particular arrangement of a harness adjustment device 200 is shown in FIGS. 6-10, it will be appreciated that adjustments and modification, including the addition, removal, modification, rearrangement, etc. of components may be employed without departing from the scope of the disclosed concept. Another example embodiment will be described hereinafter.

Figure 11:
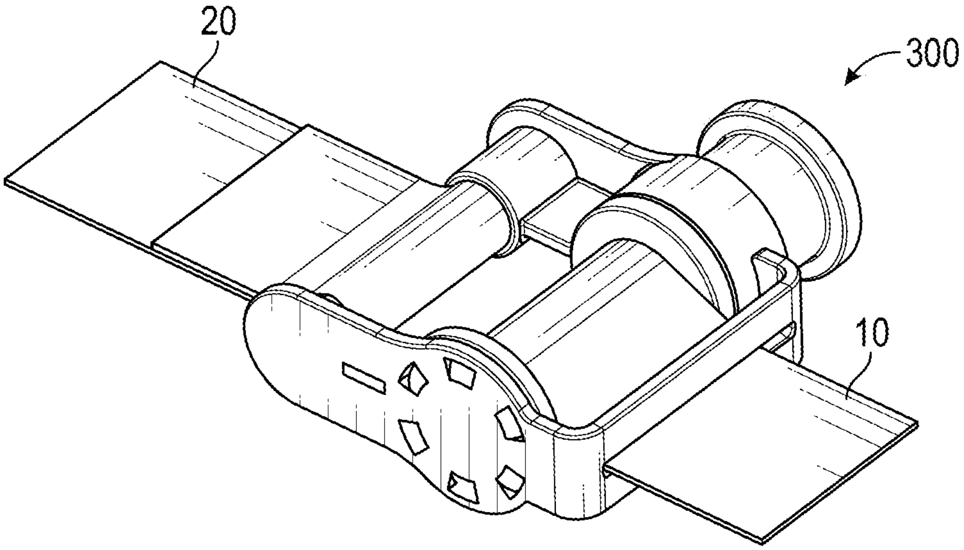
FIG. 11 is a view of a harness adjustment device in a locked position in accordance with another example embodiment of the disclosed concept.
Figure 12:
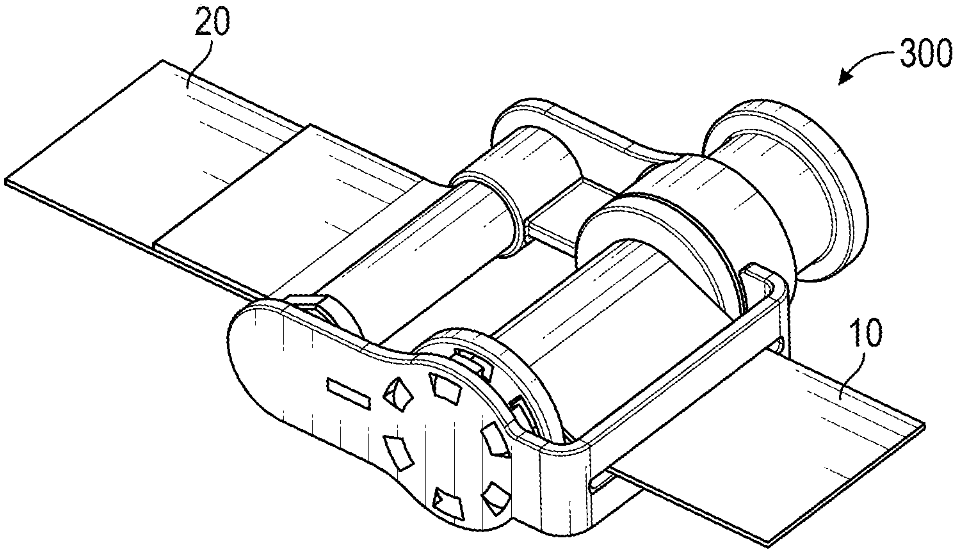
FIG. 12 is a view of the harness adjustment device of FIG. 11 in an unlocked position in accordance with an example embodiment of the disclosed concept.
Figure 13:
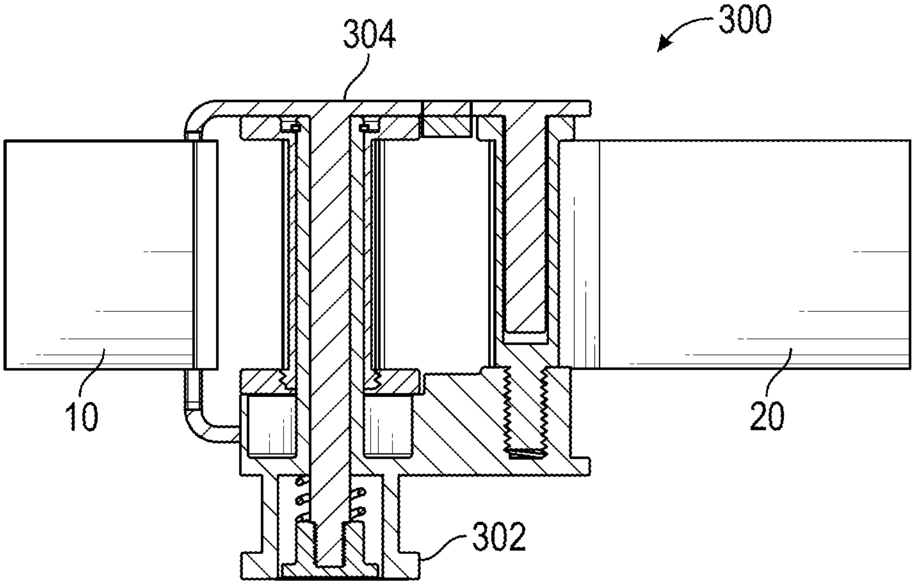
FIG. 13 is another view of the harness adjustment device of FIG. 11 in a locked position in accordance with an example embodiment of the disclosed concept.
Figure 14:
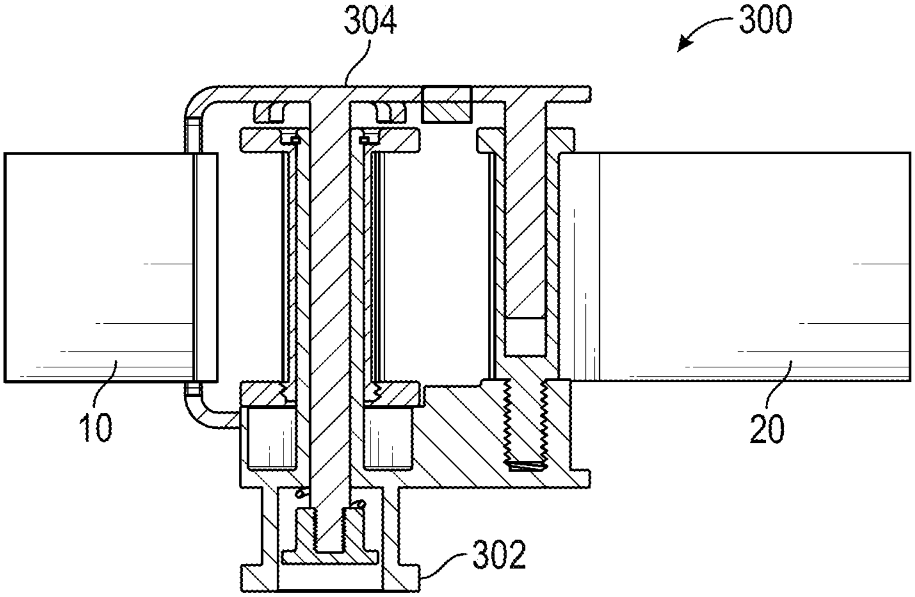
FIG. 14 is another view of the harness adjustment device of FIG. 11 in an unlocked position in accordance with an example embodiment of the disclosed concept.

FIGS. 11 and 13 are a views of a harness adjustment device 300 in a locked position in accordance with another example embodiment of the disclosed concept. FIGS. 12 and 14 are views of the harness adjustment device 300 in an unlocked position.

The harness adjustment device 300 includes an engagement mechanism 304 that is integrated into the frame of the harness adjustment device 300. The engagement mechanism 304 includes a frame body and one or more prongs that extend from the frame body (best shown in FIG. 16). The harness adjustment device 300 also includes a toothed rotational member 302. The toothed rotational member 300 includes a spool structured to receive the webbing 10. Rotation of the toothed rotational member 300 draws in or lets out the webbing 10 from the harness adjustment device 300.

An end of the toothed rotational member 302 includes a button, which when pressed, causes the toothed rotational member 302 to separate from the engagement mechanism 304, as is shown in FIG. 14. The default position of the toothed rotational member 302 is abutting against the engagement mechanism 304, as is shown in FIG. 12. In this position, the prongs of the engagement mechanism 304 are disposed between teeth of the toothed rotational member 302, which prevents the toothed rotational member 302 from rotating. The toothed rotational member 302 may include a spring which biases it against the engagement mechanism 304. Pressing the button overcomes the bias and separates the toothed rotational member 302 from the engagement mechanism 304, thus allowing the toothed rotational member 302 to rotate and for the webbing 10 to be drawn in or let out. It will be appreciated that a torsional spring may also be employed to bias the toothed rotational member 302 to rotate in a direction which draws in the webbing 10.

Figure 15:
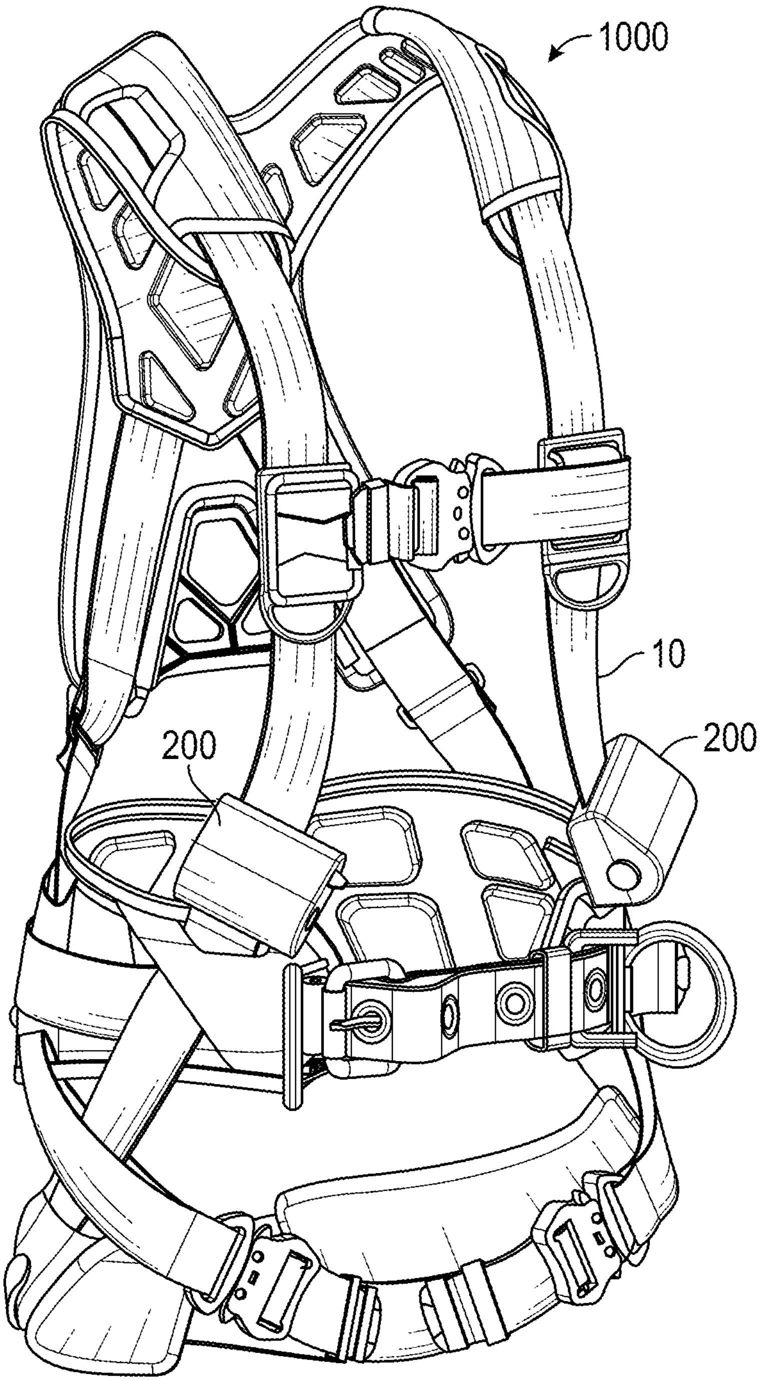
FIG. 15 is a view of a harness including harness adjustment devices in accordance with an example embodiment of the disclosed concept.
Figure 16:
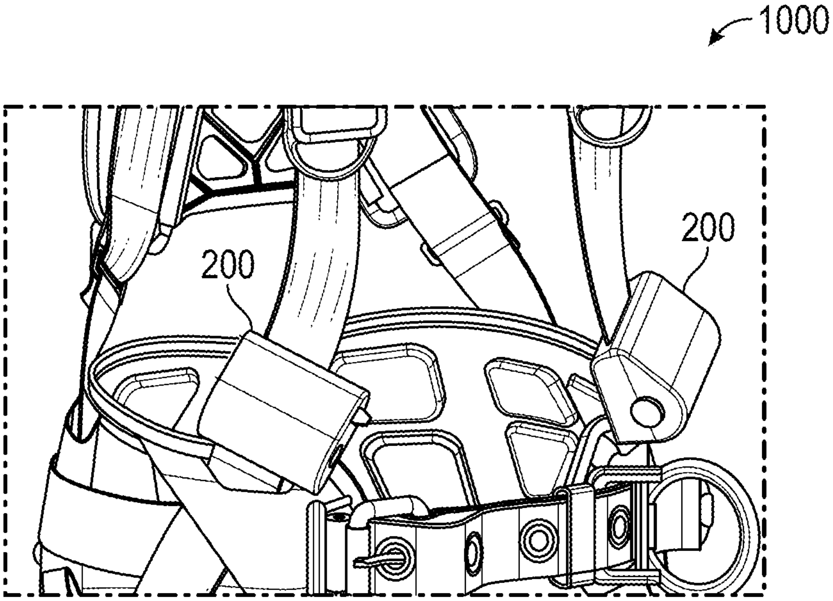
FIG. 16 is a view of a portion of a harness including harness adjustment devices in accordance with an example embodiment of the disclosed concept.

FIGS. 15 and 16 are views of a harness 1000, such as a safety harness for a fall protection system, including harness adjustment devices 200 in accordance with an example embodiment of the disclosed concept. As shown in FIGS. 15 and 16, the harness adjustment device 200 may be attached to the webbing 10 included in a strap of the harness 1000. The harness adjustment device 200 may be employed, as described herein, to adjust the length of the webbing of the strap it is attached to. While the harness adjustment device 200 is shown in FIGS. 15 and 16, it will be appreciated that other harness adjustment devices, such as the harness adjustment devices 100 and 300, may similarly be employed with the harness 1000 to adjust the length of webbing of straps of the harness 1000.

In accordance with some example embodiments of the disclosed concept, a harness adjustment device provides for adjustment of the length of webbing of a strap of a harness. The harness adjustment device may default to a locked position in which the webbing may not be drawn in or let out. The harness adjustment device may be changed to an unlocked position with one hand, by a user, such that the webbing can be drawn in or let out. In some example embodiments, the harness adjustment device may be biased to automatically draw in the webbing. In this manner, the webbing may be drawn in to a snug fit, and then when the user releases the harness adjustment device, it defaults back to the locked position, thus fixing the length of the webbing in the strap. Thus, a user can easily use the harness adjustment device described in some example embodiments of the disclosed concept to conveniently adjust the fit of a harness. In addition, example embodiments of the disclosed concept retain excess webbing. Any drawn in webbing is wrapped around the spool of the toothed rotational member. Some other ratchet type adjustment devices have an excess end of the webbing that is pulled through the device that needs to be dealt with by rolling or folding the excess webbing and retaining it with an elastic keeper. As example embodiments of the disclosed concept do not have an excess end of the webbing, there is no need to spend extra time after adjustment to deal with excess webbing.

In accordance with some example embodiments of the disclosed concept, such as harness adjustment devices 100 and 200, a lockable spool (e.g., the spool of the toothed rotational member 112 or 208) can be locked to prevent drawing in or letting out the webbing or unlocked to allow drawing in or letting out of the webbing. In some example embodiments, unlocking the lockable spool requires two actions such as pressing the corresponding engagement mechanism at two points. One action, such as just pressing an end portion of the first engagement mechanism 106, would be insufficient to cause unlocking, whereas two action, pressing both the first and second engagement mechanisms 106,108 would cause unlocking. In this manner, unlocking is still convenient while inadvertent unlocking is prevented. A biasing member, such as a torsional spring, is also used to bias the lockable spool to draw in the webbing.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A harness adjustment device for adjusting a length of webbing, the harness adjustment device comprising:
- a toothed rotational member including a spool structured to receive the webbing and an end portion including teeth disposed at an end of the spool, the toothed rotational member being structured to rotate to draw in or let out the webbing;
- an engagement mechanism having an engagement portion,
- wherein the engagement portion is structured to move between a first position in which the engagement portion abuts against the toothed rotational member between at least two of the teeth and prevents rotation of the toothed rotational member to prevent both drawing in and letting out of the webbing, and a second position in which the engagement portion is separated from the toothed rotational member and allows rotation of the toothed rotational member to allow drawing in and letting out of the webbing,
- wherein the engagement mechanism is structured to require a plurality of actions to change from the first position to the second position.

2. The harness adjustment device of claim 1, wherein the engagement mechanism comprises:
- a first engagement mechanism; and
- a second engagement mechanism including the engagement portion.

3. The harness adjustment device of claim 2, further comprising:
- a first biasing member coupled to the first and second engagement mechanisms and structured to bias the second engagement mechanism toward the first position; and
- a second biasing member coupled to the first and second engagement mechanisms and structured to bias the second engagement mechanism toward the first position.

4. The harness adjustment device of claim 3, wherein the first and second biasing member are springs.

5. The harness adjustment device of claim 3, wherein the first engagement mechanism includes a first end portion and the second engagement mechanism includes a second end portion, wherein the first and second engagement mechanisms are structured such that simultaneously pressing the first and second end portions toward each other causes the second engagement mechanism to move from the first position to the second position.

6. The harness adjustment device of claim 2, further comprising:
- a first frame portion;
- a second frame portion; and
- a plurality of spacers disposed between the first and second frame portions,
- wherein the spool extends between the first and second frame portions and the end portion of the toothed rotational member is disposed outside the second frame portion.

7. The harness adjustment device of claim 6, further comprising:
- a first end cover coupled to the first frame portion; and
- a second end cover coupled to the second frame portion,
- wherein the second end cover covers the end portion of the toothed rotational member and portions of the first and second engagement mechanisms, and
- wherein end portions of the first and second engagement mechanisms extend outside the second end cover.

8. The harness adjustment device of claim 2, wherein the second engagement mechanism includes a planar body portion disposed in a plane parallel to the end portion of the toothed rotational member, wherein the engagement portion includes at least one prong that extends in a direction perpendicular to the planar body portion, and wherein when the second engagement mechanism is in the first position, the at least one prong extends between teeth of the toothed rotational member.

9. The harness adjustment device of claim 2, further comprising:
- an axle that extends though the toothed rotational member, wherein the first and second engagement mechanisms include an opening through which the axle extends.

10. The harness adjustment device of claim 1, further comprising:
- a torsional spring structured to bias the spool to draw in the webbing.

11. The harness adjustment device of claim 1, further comprising:
- a cover structured to cover the toothed rotational member and a portion of the engagement mechanism,
- wherein the engagement mechanism includes an end portion that extends to an area outside of the cover.

12. The harness adjustment device of claim 1, further comprising:
- a frame structured to support the toothed rotational member and the engagement mechanism.

13. The harness adjustment device of claim 1, further comprising:
- a biasing member structured to bias the toothed rotational member against the engagement mechanism.

14. The harness adjustment device of claim 13, wherein the toothed rotational member includes a button, and wherein the toothed rotational member is structured such that pressing the button causes the toothed rotational member to separate from the engagement mechanism.

15. A safety harness for use in a fall protection system, the safety harness comprising:
- a strap composed of webbing;
- a harness adjustment device coupled to the webbing and structured to adjust a length of the webbing, the harness adjustment device comprising:
  - a toothed rotational member including a spool structured to receive the webbing and an end portion including teeth disposed at an end of the spool, the toothed rotational member being structured to rotate to draw in or let out the webbing;
  - an engagement mechanism having an engagement portion,
  - wherein the engagement portion is structured to move between a first position in which the engagement portion abuts against the toothed rotational member between at least two of the teeth and prevents rotation of the toothed rotational member to prevent both drawing in and letting out of the webbing, and a second position in which the engagement portion is separated from the toothed rotational member and allows rotation of the toothed rotational member to allow both drawing in and letting out of the webbing,
  - wherein the engagement mechanism is structured to require a plurality of actions to change from the first position to the second position.

16. A harness adjustment device for adjusting a length of webbing, the harness adjustment device comprising:

a lockable spool structured to draw in or let out the webbing, the lockable spool being prevented from both drawing in and letting out the webbing when locked and being allowed to draw in and let out the webbing when unlocked;

a biasing member structured to bias the lockable spool to draw in the webbing; and an engagement mechanism structured to selectively lock and unlock the lockable spool, wherein the engagement mechanism is structured to require a plurality of actions to unlock the lockable spool.

17. The harness adjustment device of claim 16, wherein the plurality of actions include a first action of pressing the engagement mechanism at a first point and a second action of the pressing the engagement mechanism at a second point.

18. The harness adjustment device of claim 16, wherein the biasing member is a torsional spring.

19. The harness adjustment device of claim 16, wherein the engagement mechanism is structured to require two actions to unlock the lockable spool.

* * * * *